Nov. 25, 1947. E. A. STALKER 2,431,592
AIRCRAFT HAVING AXIAL FLOW COMPRESSOR AND BOUNDARY LAYER INTAKE
Filed Aug. 9, 1945
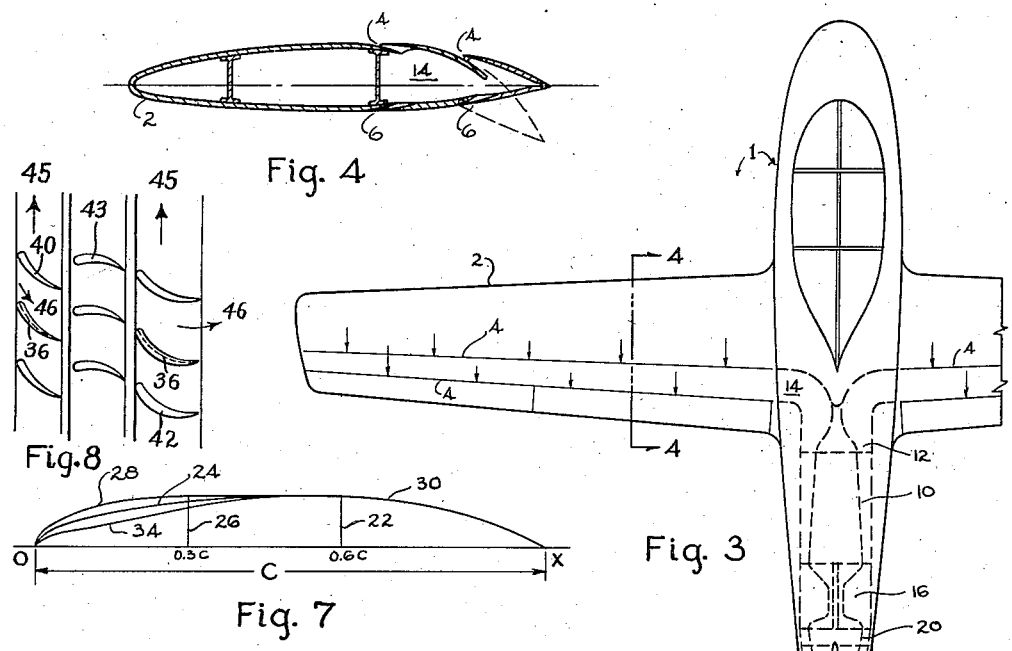
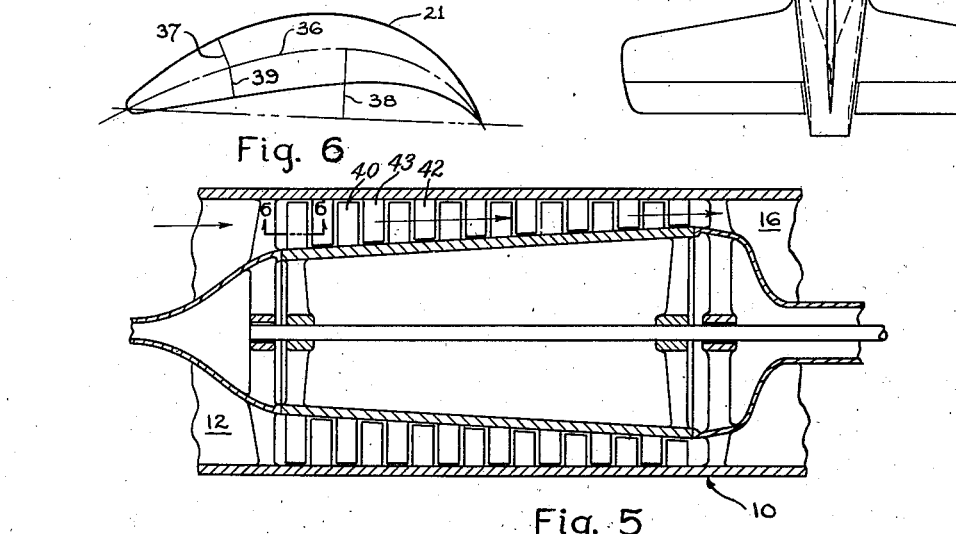
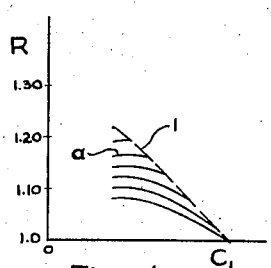
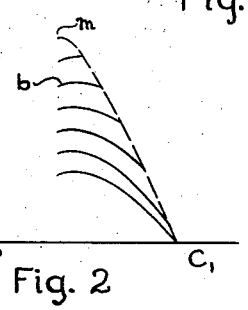
INVENTOR.
Edward A. Stalker
BY
Marechal & Biebel
ATTORNEYS Patented Nov. 25, 1947

2,431,592

UNITED STATES PATENT OFFICE 2,431,592

AIRCRAFT HAVING AXIAL FLOW COMPRESSOR AND BOUNDARY LAYER INTAKE

Edward A. Stalker, Bay City, Mich.

Application August 9, 1945, Serial No. 609,847

11 Claims. (Cl. 244—15)

1

This invention relates to aircraft.

It is the principal object of the invention to provide a power plant system for an aircraft incorporating an axial flow compressor which may be operated at a relatively high compression ratio while retaining adequate volume range for all normal operating conditions of the aircraft.

It is also an object to provide a power plant system for an aircraft in which an axial flow compressor is supplied with boundary layer air of relatively low velocity and the range of velocities of which under varying operating conditions of the aircraft is substantially reduced, making it possible and practicable to operate the compressor at substantially increased compression ratios.

It is also an object to provide such compressor with a blade shape which is particularly advantageous for operation at relatively high pressure ratios per stage of the compressor and under reduced volume range conditions.

Other objects and advantages will be apparent from the following description, the accompanying drawing and the appended claims.

In the drawing:

Fig. 1 is a typical plot of pressure ratio R against volume delivery coefficient $C_1$ for a conventional axial-flow compressor;

Fig. 2 is a similar plot of the characteristics of a compressor of the type of this invention;

Fig. 3 is a fragmentary top plan view of an aircraft employing a compressor as part of its propulsive power plant;

Fig. 4 is a section of the wing of the aircraft along the line 4—4 in Fig. 3;

Fig. 5 is an axial section of a compressor in accordance with this invention;

Fig. 6 is a cross section of a compressor blade taken along line 6—6 in Fig. 5;

Fig. 7 is a diagram illustrating the basic airfoil section from which the blade of Fig. 6 is derived; and Fig. 8 is a fragmentary development of two rotors and the intervening stator.

Where a compressor is utilized as part of the main propulsive system of an aircraft, not only is the maximum compression ratio which it can develop important, but the effect of volume range on that ratio is also highly important. It is known from the characteristics of axial flow blowers that the higher the pressure ratio, the more limited becomes the volume range, volume range being defined as the range of volume delivered per revolution ($C_1$) from the condition of stalling to the condition of choking.

The range of volume delivered for which the

2 pressure is large is of great importance in an aircraft, because when the aircraft is stationary on the ground the inflow into the compressor results only from the direct action of the compressor in sucking in the air, but when the airplane is flying at high speed the inflow to the compressor is substantially greater because of the relative wind as well as the inductive action of the compressor. It will therefore be clear that the range of volume delivery from the stationary condition to the high speed condition must be very great for best operation.

This invention discloses compressor blades which produce relatively high pressure ratios. It also shows how these blades can be used in a compressor cooperating with the surfaces of the aircraft to obtain effective propulsion of the aircraft even at such high values, providing for induction of the boundary layer air thus reducing the volume range conditions to which the compressor is subjected in operation.

For this purpose the compressor inlet is placed in communication with suitable openings in the surface of the aircraft so as to induct chiefly the boundary layer of air thereon. Since this layer has an average velocity equal to about one-half the speed of flight, the volume range required of the compressor is reduced by a comparable amount.

Further it has been found highly desirable to provide such an axial-flow compressor with blades of special shape so that the compressor blades can be run at very high tip peripheral speeds and at a high pressure rise per stage. Such blades, however, have a limited volumetric range. That is the blades have relatively sharp leading edges and unless the flow divides near the edge turbulence results in the flow and the quantity delivered declines as well as the pressure ratio.

Referring to the drawings, Fig. 1 shows a plot of pressure ratios R versus a delivery coefficient $C_1$. It is clear from this curve that at a compression ratio of 1.23 the available range is zero. At lower ratios the range of $C_1$ is several hundred per cent from the left-hand side where stalling of the blades occurs to the right-hand side where choking occurs due to the flow velocity becoming sonic. This upper or sonic limit for the available range of compression ratios is given by line I. It is apparent that to obtain a substantial range in the coefficient $C_1$, it is necessary to operate at a relatively low compression ratio, as shown by curve $a$.

Fig. 2 shows a plot of the characteristics of another compressor having blades designed according to this invention with relatively sharp leading edges, special camber lines, and special thickness distribution so that they can be operated at high peripheral speeds producing a high pressure ratio. By operating this compressor with boundary layer air the available range is made adequate to the range of delivery required by the aircraft power plant. The compressor of the invention is designed to operate along curve $b$ much nearer to the maximum value $m$ and making possible a much higher compression ratio while still retaining an adequate volume range since by using boundary layer air it will not require as large a value of $C_1$.

In Figs. 3 and 4 the airplane is indicated at 1, having the wing 2 provided with the slots 4 in the upper surface and the slots 6 in the lower surface.

The compressor 10 has its inlet 12 in communication with the slots via the compartment 14 in the wing. The compressor delivers air to the combustion chamber 16 where fuel is burned forming products of combustion, such mixed air and heated products of combustion being referred to herein as the gas. The chamber directs the gas into the turbine 20 for the generation of power, the turbine being mechanically connected to the compressor 10 to cause the same to rotate.

The blade or airfoil section 21 employed to produce the large pressure rise is shown in Fig. 6. It may be developed as follows from a basic section, the forward portion of which lies within boundary basic section curves shown in Fig. 7. The basic airfoil section has the straight line OX as a chord or base line of length C. An ordinate 22 is erected equal to half the thickness of the airfoil section, such ordinate being located between the range of about the 0.4 point and the 0.6 point of the chord. Better results for the present invention are secured where such ordinate 22 is located well aft of the mid-point of the chord. In the form shown the erection is made at 0.6C measured from the nose point O.

Next, the elliptic quadrant 24 is constructed using the 0.6C as the major semi-axis and ordinate 22 as the minor semi-axis. At the 0.3C point the ordinate 26 is erected equal to ordinate 22 and the elliptic quadrant 28 is constructed with the ordinate 26 as the minor semi-axis and the 0.3C as the major semi-axis. The elliptic quadrant is continued rearward to become tangent with quadrant 24, and then with a desirable smooth curve 30 to the trailing point X. Measuring perpendicular to line OX, ordinates are laid off below quadrant 24 equal to the distance of quadrant 28 thereabove. This gives the lower boundary curve 34.

The basic airfoil section ahead of its ordinate of maximum thickness will lie in major part within the boundary curves 28 and 34, preferably below the mean curve 24 to provide a sharper nose contour. By having it lie within such boundaries the nose of the basic section will have an appreciable nose curvature of desirable form. However the nose may be sharpened further and the equivalent radius of curvature reduced for services where pressure is almost the only consideration. The remainder of the basic airfoil section is obtained by laying off below the chord line OX the curve selected above the chord line.

The compressor blade in Fig. 6 uses the basic airfoil contour whose upper half is shown in Fig. 7. Instead of being laid off with respect to a mean camber line which is straight, as OX, it is developed with respect to a mean camber line which has a substantial arching as shown at 36. The mean camber line 36 is arched to provide the maximum ordinate 38 aft of the 0.4C point and preferably aft the midpoint. Abscissae are measured off in per cent of the mean camber line length along the mean camber line. Perpendicular to the mean camber line and at percentage points corresponding to like percentage points along the chord OX, the half-thickness ordinates of the basic section are laid off above and below the mean camber line giving the airfoil or blade section 21 of Fig. 6. Ordinates 37 and 39 are typical of those laid off perpendicular to the mean camber line.

The maximum ordinate 38 of the mean camber line 36 is placed preferably well aft of the midpoint of the chord. Likewise the maximum thickness is preferably aft of the midpoint. Since the greatest acceleration of the external flow will occur where the upper surface of an airfoil is curved the most, the greatest local velocities will occur on the aft portion of the blade just described.

In an axial compressor there is a pressure rise from the front of the rotor to the rear which, according to Bernoulli's equation, must be accompanied by a decrease in velocity between the blades. The blade section with its speeding-up properties near the rear of the blade takes advantage of the slowing down in the stage so that the velocity distribution over the blade, when in the rotor, is substantially uniform. It is also found advantageous to provide a substantial increase in the maximum ordinates of the mean camber lines of the airfoil sections of axially successive blades of a multi-stage compressor in the downstream direction. This is shown in fragmentary developed form in Fig. 8 in which the blades 40 of the upstream rotor have substantially less camber than the blades 42 of the succeeding or downstream rotor, the stator blades being indicated at 43. Other blades further downstream would have even larger cambers. The arrows 45 indicate the direction of rotation of the rotors while arrows 46 indicate the direction of the fluid flow.

To achieve this uniform distribution at very high peripheral speeds, at the sacrifice of volumetric range the nose of the section is made quite pointed since it will attack air which has not yet been slowed down within the rotor.

It is a feature of this invention that the blade has the type of airfoil section described with a substantial value to the height of the mean camber line. This value is preferably greater than 5 per cent of the chord C and preferably less than 50 per cent.

As a result of the use of a compressor with blades of such construction to obtain a high pressure ratio and relatively low volumetric range, and operating to cause the induction of relatively slowly moving air from the surface of an aircraft, the desirable high pressure ratio is obtained and at the same time the limiting effects of a low volumetric range are overcome. As already described, this is accomplished by having the blower induct the boundary layer to form the propulsive jet. Since the air in this layer has only about half the velocity of flight, the compressor needs to serve only a fraction of the volumetric range which would be required by intake of the air having the full relative velocity.

The invention has been described with respect to a type of compressor commonly called an "axial flow compressor" to distinguish it from centrifugal compressors in which the flow is radial employing centrifugal action. The invention however is applicable to any compressor using airfoil sections for the blades and relying chiefly on a lift force to impel the fluid as in my U. S. Patent No. 2,177,159 of October 24, 1939. Cross reference is also made to my copending application, now Patent No. 2,405,768, issued August 13, 1946, which discloses the blades of the type herein referred to.

While the form of apparatus herein described constitutes a preferred embodiment of the invention, it is understood that the invention is not limited to this precise form of apparatus, and that changes may be made therein without departing from the scope of the invention which is defined in the appended claims.

What is claimed is:

1. In combination in an aircraft having a slot in its external surface for the induction of boundary layer air having a substantially lower velocity range relative to the aircraft than the speed of flight, an axial flow compressor having a blade across which the flow travels with substantially no increase in velocity from its leading to its trailing edge thereby limiting the volumetric range with increasing pressure ratio, said blade having a basic airfoil section whose maximum thickness lies aft of about the 0.4 point of the chord and whose upper contour ahead of the maximum thickness ordinate lies in major part within boundary curves whose mean curve is an elliptic quadrant passing through the nose point of the section and the end point of the said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the said maximum thickness of the said airfoil section, means to rotate said blade with a high peripheral velocity to produce a large pressure ratio, and means placing the inlet of said compressor in communication with said slot to induct said boundary layer air of low velocity range from said surface and compress said air thereby retaining the large pressure ratio and reducing the need for a large volumetric range.

2. In combination in an aircraft having a slot in its external surface for the induction of boundary layer air having a substantially lower velocity range relative to the aircraft than the speed of flight, an axial flow compressor having a blade across which the flow travels with substantially no increase in velocity from its leading to its trailing edge thereby limiting the volumetric range with increasing pressure ratio, said blade having a basic airfoil section whose maximum thickness lies aft of about the 0.4 point of the chord and whose upper contour ahead of the maximum thickness ordinate lies in major part within boundary curves whose mean curve is an elliptic quadrant passing through the nose point of the section and the end point of the said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the said maximum thickness of the said airfoil section, means to rotate said blade with a high peripheral velocity to produce a large pressure ratio, means placing the inlet of said compressor in communication with said slot to induct said boundary layer air of low velocity range from said surface and compress said air thereby retaining the large pressure ratio and reducing the need for a large volumetric range, and means to heat and expel said inducted air rearward with increased velocity to provide thrust for the aircraft.

3. In combination in an aircraft having a slot in its external surface for the induction of boundary layer air having a substantially lower velocity range relative to the aircraft than the speed of flight, a power plant utilizing compressed air for generating power to propel the aircraft, an axial flow compressor having a blade across which the flow travels with substantially no increase in velocity from its leading to its trailing edge thereby limiting the volumetric range with increasing pressure ratio, said blade having a section whose mean camber line has its maximum ordinate above the subtending chord located substantially aft of the midpoint of the chord and whose maximum thickness is substantially aft of the 0.4C point, said blade section having a convex upper aft contour and a concave lower aft contour forming therewith a relatively sharp trailing edge, means to rotate said blade with a high peripheral velocity to produce a large pressure ratio, means placing the inlet of said compressor in communication with said slot to supply said power plant with air at high pressure from the boundary layer thereby retaining the large compression ratio of the compressor and reducing the need for a large range of volume delivery.

4. In combination in an aircraft having a slot in its external surface for the induction of boundary layer air having a substantially lower velocity range relative to the aircraft than the speed of flight, a gas turbine power plant utilizing compressed air for generating power to propel the aircraft, an axial flow compressor having a blade across which the flow travels with substantially no increase in velocity from its leading to its trailing edge thereby limiting the volumetric range with increasing pressure ratio, said blade having a blade section developed from a basic section whose maximum thickness ordinate lies aft of about the 0.4 point of the chord and whose upper contour ahead of the maximum thickness ordinate lies below an elliptic quadrant passing through the nose point of the section and the end point of the said maximum thickness ordinate serving as the minor semi-axis of said quadrant, said minor semi-axis being equal to one-half the said maximum thickness of the airfoil section, said blade section being developed with respect to an arched mean camber line having its maximum ordinate above the subtending chord aft of the midpoint thereof, means to rotate said blade with a high peripheral velocity to produce a large pressure ratio, means placing the inlet of said compressor in communication with said slot to supply said power plant with air from the boundary layer thereby retaining the large compression ratio of the compressor and reducing the need for a large range of volume delivery.

5. In combination in an axial flow compressor, a plurality of axial flow compressor blades disposed in tandem along the axis of the compressor, each said blade having a blade section developed with respect to an arched mean camber line from a basic airfoil section whose maximum thickness lies aft of about the 0.4 point of the chord and whose upper contour ahead of the maximum thickness ordinate lies in major part within boundary curves whose mean curve is an elliptic quadrant passing through the nose point of the section and the end point of the said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the maximum thickness of said airfoil section, the maximum ordinates of the mean camber lines of the airfoil section of axially successive blades substantially increasing from blade to blade in the downstream direction, and a casing to house said blades and direct a flow of fluid through successive blades.

6. In combination in an axial flow compressor, a plurality of axial flow compressor blades disposed in tandem along the axis of the compressor to form a multistage compressor, each said blade having a blade section developed with respect to an arched mean camber line from a basic airfoil section whose maximum thickness lies aft of the station at about the 0.4 point of the chord and whose upper contour ahead of the maximum thickness ordinate lies in major part within boundary curves whose mean curve is an elliptic quadrant passing through the nose point of the section and the end point of the said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the maximum thickness of said airfoil section, the maximum ordinates of the mean camber lines of the airfoil sections of axially successive blades substantially increasing from blade to blade in the downstream direction, and a casing to house said blades and direct a flow of fluid through successive blades, the majority of said blades having a mean camber line maximum ordinate greater than .5 per cent of the length of the subtending chord.

7. In combination in an aircraft having an airfoil surface on which a boundary layer is adapted to form in flight, said boundary layer having substantially less velocity relative to the aircraft than the speed of flight, a power plant for propelling said aircraft including an axial flow compressor having blades across each of which the flow travels with substantially no increase in velocity from the leading to the trailing edge thereof thereby limiting the volumetric range with increasing pressure ratio, said blades having a basic airfoil section whose maximum thickness ordinate is located between the range of about the 0.4 and the 0.6 points of the chord and whose upper contour ahead of the maximum thickness ordinate lies in major part within boundary curves whose mean curve is an elliptic quadrant passing through the nose point of the section and the end point of said maximum thickness ordinate serving as the minor semi-axis of said quadrant, the outer curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the said maximum thickness of the said airfoil section, and means for supplying said boundary layer into the intake of said compressor to provide a supply of air thereto of relatively low volume range providing for development by said compressor of substantially increased compression ratios.

8. An aircraft having an airfoil surface on which a boundary layer is adapted to form in flight, said boundary layer air having substantially half the average velocity relative to the aircraft of the speed of flight and a corresponding reduction in velocity change between the flight and the standstill conditions of the aircraft, a power plant for propelling said aircraft including a compressor of the axial flow type having blades across each of which the flow travels with substantially no increase in velocity from the leading to the trailing edge thereof thereby limiting the volumetric range with increasing pressure ratio, said blades having a basic airfoil section whose maximum thickness lies aft of about the 0.4 point of the chord and whose upper contour ahead of the maximum thickness ordinate lies in major part within boundary curves whose mean curve is an elliptic quadrant passing through the nose point of the section and the end point of said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the said maximum thickness of the said airfoil section, and means for supplying said boundary layer into the intake of said compressor to provide a supply of air thereto of relatively low volume range providing for development by said compressor of substantially increased compression ratios.

9. In an aircraft having a slot in its external surface for the induction of boundary layer air having a substantially lower velocity range relative to the aircraft than the speed of flight, the combination of an axial flow compressor having a blade across each of which the flow travels with substantially no increase in velocity from the leading to the trailing edge thereof thereby limiting the volumetric range with increasing pressure ratio, said blade having a basic airfoil section whose maximum thickness lies aft of about the 0.4 point of the chord and whose upper contour ahead of the maximum thickness ordinate lies in major part within boundary curves whose mean curve is an elliptic quadrant passing through the nose point of the section and the end point of the said maximum thickness ordinate serving as the minor semi-axis of said quadrant, the outer curve of said boundary curves being an auxiliary elliptic quadrant passing through said nose point and the end of an auxiliary minor semi-axis at the 0.3 point of the chord and extending on to the outer end of said maximum thickness ordinate, said auxiliary minor semi-axis being equal to one-half the said maximum thickness of the said airfoil section, said blade being rotatable with a high peripheral velocity to produce a large pressure ratio, and means for supplying said low velocity boundary layer air from said slot to said blade to provide for compression of said air to a high pressure ratio with reduced need for a large volumetric range.

10. In combination in an aircraft having a slot in its external surface for the induction of boundary layer air whose range of relative velocities is substantially less than the range of velocities of flight of the aircraft, an axial flow compressor having a blade across which the flow travels with substantially no increase in velocity from its leading to its trailing edge thereby limiting the volumetric range with increasing pressure ratio, means to rotate said blade with a high peripheral velocity to produce a large pressure ratio, and means placing the inlet of said compressor in communication with said slot to induct said boundary layer air from said surface and to compress said air at a range of inlet air velocities substantially smaller than the range of velocities of flight of the aircraft with resulting improvement in pressure and efficiency performance.

11. In combination in an aircraft having a slot in its external surface for the induction of boundary layer air whose range of relative velocities is substantially less than the range of velocities of flight of the aircraft, an axial flow compressor having a blade across which the flow travels with substantially no increase in velocity from its leading to its trailing edge thereby limiting the volumetric range with increasing pressure ratio, means to rotate said blade with a high peripheral velocity to produce a large pressure ratio, means placing the inlet of said compressor in communication with said slot to induct said boundary layer air from said surface and to compress said air, thereby operating the compressor in the aircraft at a range of inlet air velocities substantially smaller than the range of velocities of flight of the aircraft with resulting improvement in pressure and efficiency performance, and means to discharge said inducted air rearward to propel the aircraft throughout said range of flight velocities.

EDWARD A. STALKER.

REFERENCES CITED

The following references are of record in the file of this patent:

FOREIGN PATENTS

| Number | Country | Date |
|--------|---------|------|
| 512,064 | Great Britain | Aug. 29, 1939 |

Certificate of Correction

Patent No. 2,431,592.  November 25, 1947.

EDWARD A. STALKER

It is hereby certified that errors appear in the printed specification of the above numbered patent requiring correction as follows: Column 8, line 53, claim 9, strike out "each of"; lines 54 and 55, each occurrence, for the word "the" read *its*; line 55, strike out "thereof"; and that the said Letters Patent should be read with these corrections therein that the same may conform to the record of the case in the Patent Office.

Signed and sealed this 24th day of February, A. D. 1948.

[SEAL]

THOMAS F. MURPHY,
*Assistant Commissioner of Patents.*